(12) United States Patent
Lyu

(10) Patent No.: US 10,044,495 B2
(45) Date of Patent: Aug. 7, 2018

(54) PHASE SYNCHRONIZATION METHOD AND APPARATUS FOR ASYNCHRONOUS TDD SYSTEM

(71) Applicant: Huawei Technologies Co., Ltd., Shenzhen, Guangdong (CN)

(72) Inventor: Rui Lyu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 130 days.

(21) Appl. No.: 15/283,799

(22) Filed: Oct. 3, 2016

(65) Prior Publication Data
US 2017/0026165 A1    Jan. 26, 2017

Related U.S. Application Data

(63) Continuation of application No. PCT/CN2014/074804, filed on Apr. 4, 2014.

(51) Int. Cl.
| | |
|---|---|
| *H04L 7/00* | (2006.01) |
| *H04L 5/14* | (2006.01) |
| *H03L 7/087* | (2006.01) |
| *H04W 56/00* | (2009.01) |

(52) U.S. Cl.
CPC ........... *H04L 7/0041* (2013.01); *H04L 5/14* (2013.01); *H04W 56/0035* (2013.01); *Y02D 70/00* (2018.01)

(58) Field of Classification Search
CPC ....... H04L 5/14; H04L 7/0041; H04L 7/0338; H04L 7/0331; H04L 7/0083; H04L 27/2626; H04L 27/2647; H04W 56/0035; H03D 99/00; Y02D 70/00
See application file for complete search history.

(56) References Cited

U.S. PATENT DOCUMENTS

| | | | |
|---|---|---|---|
| 5,134,309 A | 7/1992 | Matsumoto et al. | |
| 6,552,608 B2 * | 4/2003 | Matsuda | H03F 1/3235 330/151 |
| 6,775,082 B2 * | 8/2004 | Kondo | G11B 20/1403 360/31 |
| 7,724,856 B2 * | 5/2010 | Nakahara | H04L 7/0083 375/355 |

(Continued)

FOREIGN PATENT DOCUMENTS

| | | |
|---|---|---|
| CN | 101106413 A | 1/2008 |
| CN | 101583185 A | 11/2009 |
| WO | 2013031013 A1 | 3/2013 |

*Primary Examiner* — Ahmed Elallam

(57) ABSTRACT

Embodiments of the present invention provide a apparatus. The apparatus includes: N timing phase adjusters, a level calculator, and a first selector, where N is an integer greater than or equal to 2; the timing phase adjuster is configured to perform phase adjustment on a first signal according to a phase adjustment value, to obtain an adjusted first signal, where the first signal is a baseband signal, and the N timing phase adjusters respectively correspond to different phase adjustment values; the level calculator is configured to acquire level fluctuation values, within a preset time, of N adjusted first signals, determine an identifier of an adjusted first signal corresponding to a minimum level fluctuation value, and send the identifier to the first selector; and the first selector is configured to output the adjusted first signal corresponding to the identifier.

15 Claims, 6 Drawing Sheets

(56) References Cited

U.S. PATENT DOCUMENTS

| | | | |
|---|---|---|---|
| 7,902,918 B2 * | 3/2011 | Yamamoto | G01R 31/31727 329/307 |
| 6,256,337 B1 | 7/2011 | Hendrickson et al. | |
| 2002/0018483 A1 | 2/2002 | Kuwabara et al. | |
| 2012/0105111 A1 * | 5/2012 | Maeda | H03F 1/0205 327/107 |

* cited by examiner

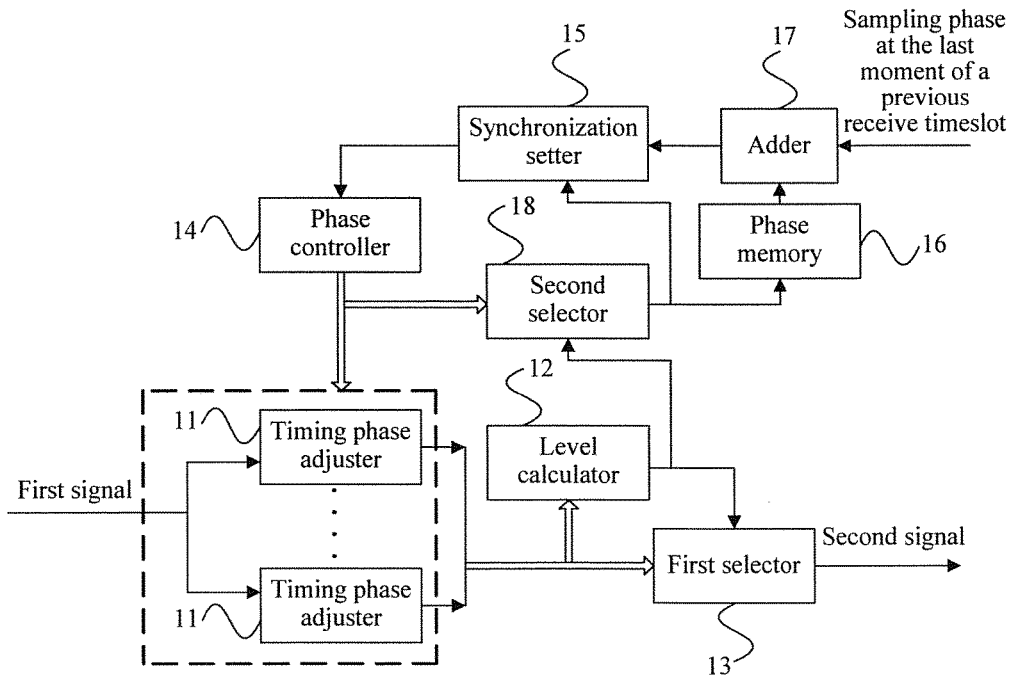

FIG. 8

Separately perform phase adjustment on a first signal according to N different phase adjustment values, to obtain N adjusted first signals, where the first signal is a baseband signal, and N is an integer greater than or equal to 2   ⸺ S101

Acquire level fluctuation values, within a preset time, of the N adjusted first signals   ⸺ S102

Determine an identifier of an adjusted first signal corresponding to a minimum level fluctuation value   ⸺ S103

Determine a second signal from the N adjusted first signals according to the identifier, and output the second signal, where the second signal is the adjusted first signal corresponding to the identifier   ⸺ S104

FIG. 9

PHASE SYNCHRONIZATION METHOD AND APPARATUS FOR ASYNCHRONOUS TDD SYSTEM

CROSS-REFERENCE TO RELATED APPLICATIONS

This application is a continuation of International Application No. PCT/CN2014/074804, filed on Apr. 4, 2014, the disclosure of which is hereby incorporated by reference in its entirety.

TECHNICAL FIELD

Embodiments of the present invention relate to the field of communications technologies, and in particular, to a phase synchronization method and apparatus for an asynchronous TDD system.

BACKGROUND

In an asynchronous time division duplex (TDD) system, two stations separately use respective clock information. To implement synchronization of the two stations (such as a station A and a station B), the station A needs to extract a clock signal of a transmitter in the station B from a signal sent by the station B, and then the station A adjusts a clock signal of a receiver in the station A to be consistent with the clock signal of the transmitter in the station B.

In the prior art, the station B inserts a relatively long random signal into an initial position of a transmit timeslot, where the random signal carries no information and is used to help the station A complete clock signal synchronization. After the station A is switched to a receive timeslot, the station A recaptures and traces a clock signal (including a frequency and a phase) from a random signal received in an initial position of the receive timeslot, of the transmitter in the station B by using a clock recovery circuit including a phase-locked loop, and then the station A receives, by using the clock signal of the transmitter in the station B, a wanted signal sent by the station B.

However, in the prior art, a large quantity of random signals need to be inserted to enable the station A to acquire the phase of the clock signal of the transmitter in the station B. As a result, overheads are relatively high, and transmission efficiency is reduced.

SUMMARY

Embodiments of the present invention provide a phase synchronization method and apparatus for an asynchronous TDD system, which are used to implement fast phase synchronization, reduce overheads required by the phase synchronization, and improve a transmission rate.

According to a first aspect, an embodiment of the present invention provides a phase synchronization apparatus for an asynchronous TDD system, including: N timing phase adjusters, a level calculator, and a first selector, where each of the N timing phase adjusters is connected to the level calculator and the first selector, and the level calculator is connected to the first selector, where N is an integer greater than or equal to 2;

the timing phase adjuster is configured to perform phase adjustment on a first signal according to a phase adjustment value corresponding to the timing phase adjuster, to obtain an adjusted first signal, and separately send the adjusted first signal to the level calculator and the first selector, where the first signal is a baseband signal, and the N timing phase adjusters respectively correspond to different phase adjustment values;

the level calculator is configured to acquire level fluctuation values, within a preset time, of the N adjusted first signals that are obtained by the N timing phase adjusters, determine an identifier of an adjusted first signal corresponding to a minimum level fluctuation value, and send the identifier to the first selector; and the first selector is configured to determine a second signal from the N adjusted first signals according to the identifier sent by the level calculator, and output the second signal, where the second signal is the adjusted first signal corresponding to the identifier.

In a first possible implementation manner of the first aspect, the level fluctuation value is a level absolute difference value or a level variance value.

With reference to the first aspect or the first possible implementation manner of the first aspect, in a second possible implementation manner of the first aspect, the apparatus further includes:

a phase controller, separately connected to the N timing phase adjusters, and configured to: divide a phase range whose central value is a first phase into N equal phase subranges, and use central values of the N phase subranges as the N phase adjustment values and send the N phase adjustment values to the N timing phase adjusters respectively, where the phase range whose central value is the first phase is a phase range of [the first phase−a first preset phase, the first phase+the first preset phase].

With reference to the second possible implementation manner of the first aspect, in a third possible implementation manner of the first aspect, the apparatus further includes:

a synchronization setter, connected to the phase controller, and configured to send the phase range whose central value is the first phase to the phase controller.

With reference to the third possible implementation manner of the first aspect, in a fourth possible implementation manner of the first aspect, the apparatus further includes: a phase memory and an adder, where the phase memory is connected to the adder, and the adder is further connected to the synchronization setter;

the phase memory is configured to store a second phase, and send the second phase to the adder;

the adder is configured to add a sampling phase at the last moment of a previous receive timeslot to the second phase sent by the phase memory, and send a phase obtained through addition to the synchronization setter; and the synchronization setter is further configured to: before sending the phase range whose central value is the first phase to the phase controller, use the phase, obtained by the adder through addition, as the first phase according to a synchronization indication, where the synchronization indication is a first synchronization indication.

With reference to the fourth possible implementation manner of the first aspect, in a fifth possible implementation manner of the first aspect, the apparatus further includes: a second selector, separately connected to the level calculator, the phase controller, and the phase memory, where the level calculator is further configured to send the identifier to the second selector;

the phase controller is further configured to send the N phase adjustment values to the second selector;

the second selector is configured to determine, according to the identifier sent by the level calculator, a first phase adjustment value from the N phase adjustment values sent by the phase controller, and send the first phase adjustment value to the phase memory, where the first phase adjustment value is a phase adjustment value in the N phase adjustment values that is used to obtain the second signal corresponding to the identifier; and the phase memory is further configured to store the first phase adjustment value as the second phase.

With reference to the fifth possible implementation manner of the first aspect, in a sixth possible implementation manner of the first aspect, the second selector is further connected to the synchronization setter;

the second selector is further configured to send the first phase adjustment value to the synchronization setter; and the synchronization setter is further configured to: after receiving the first phase adjustment value sent by the second selector, change the synchronization indication to a second synchronization indication, and update the first phase to the first phase adjustment value.

With reference to the sixth possible implementation manner of the first aspect, in a seventh possible implementation manner of the first aspect, the synchronization setter is specifically configured to send a phase range of [the first phase adjustment value−a second preset phase, the first phase adjustment value+the second preset phase] to the phase controller, where the second preset phase is the first preset phase/N.

According to a second aspect, an embodiment of the present invention provides a phase synchronization method for an inter-frequency TDD system, including:

separately performing phase adjustment on a first signal according to N different phase adjustment values, to obtain N adjusted first signals, where the first signal is a baseband signal, and N is an integer greater than or equal to 2;

acquiring level fluctuation values, within a preset time, of the N adjusted first signals;

determining an identifier of an adjusted first signal corresponding to a minimum level fluctuation value; and determining a second signal from the N adjusted first signals according to the identifier, and outputting the second signal, where the second signal is the adjusted first signal corresponding to the identifier.

In a first possible implementation manner of the second aspect, the level fluctuation value is a level absolute difference value or a level variance value.

With reference to the second aspect or the first possible implementation manner of the second aspect, in a second possible implementation manner of the second aspect, before the separately performing phase adjustment on a first signal according to N different phase adjustment values, to obtain N adjusted first signals, the method further includes:

dividing a phase range whose central value is a first phase into N equal phase subranges; and separately using central values of the N phase subranges as the N phase adjustment values, where the phase range whose central value is the first phase is a phase range of [the first phase−a first preset phase, the first phase+the first preset phase].

With reference to the second possible implementation manner of the second aspect, in a third possible implementation manner of the second aspect, before the dividing a phase range whose central value is a first phase into N equal phase subranges, the method further includes:

acquiring a sampling phase at the last moment of a previous receive timeslot; and using a phase, obtained by adding the sampling phase at the last moment of the previous receive timeslot to a stored second phase, as the first phase according to a synchronization indication, where the synchronization indication is a first synchronization indication.

With reference to the third possible implementation manner of the second aspect, in a fourth possible implementation manner of the second aspect, the method further includes:

storing the first phase adjustment value as the second phase, where the first phase adjustment value is a phase adjustment value in the N phase adjustment values that is used to obtain the second signal.

With reference to the fourth possible implementation manner of the second aspect, in a fifth possible implementation manner of the second aspect, after the determining an identifier of an adjusted first signal corresponding to a minimum level fluctuation value, the method further includes:

changing the synchronization indication to a second synchronization indication; and updating the first phase to the first phase adjustment value according to the second synchronization indication.

With reference to the fifth possible implementation manner of the second aspect, in a sixth possible implementation manner of the second aspect, the dividing a phase range whose central value is a first phase into N equal phase subranges includes:

dividing a phase range of [the first phase adjustment value−a second preset phase, the first phase adjustment value+the second preset phase] into N equal phase subranges according to the second synchronization indication, where the second preset phase is the first preset phase/N.

According to the phase synchronization method and apparatus for asynchronous TDD that are provided by the embodiments of the present invention, N timing phase adjusters separately perform phase adjustment on a first signal; a level calculator acquires level fluctuation values of N adjusted first signals, and sends, according to that a smaller level fluctuation value indicates a smaller phase deviation, an identifier of an adjusted first signal corresponding to a minimum level fluctuation value to a first selector; and the first selector outputs the adjusted first signal corresponding to the identifier. Because a signal obtained after phase synchronization can be determined according to a minimum level fluctuation value, fast phase synchronization is implemented, and compared with the prior art, a large quantity of random signals do not need to be inserted during transmission; therefore, overheads are reduced, transmission efficiency is improved, and an access time is reduced.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 8 is a schematic structural diagram of Embodiment 4 of a phase synchronization apparatus for an asynchronous TDD system according to the present invention;

FIG. 9 is a flowchart of Embodiment 1 of a phase synchronization method for an asynchronous TDD system according to the present invention;

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
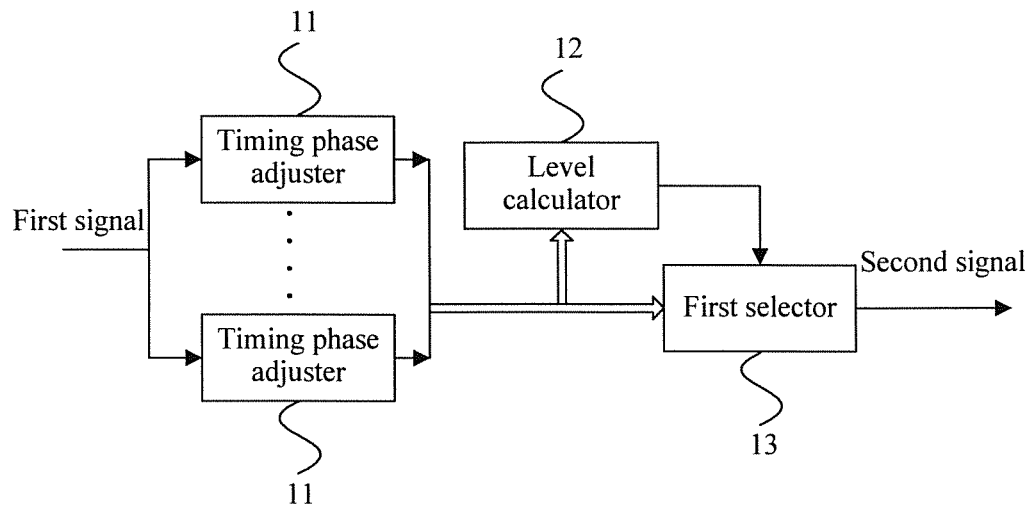
FIG. 1 is a schematic structural diagram of Embodiment 1 of a phase synchronization apparatus for an asynchronous TDD system according to the present invention.

FIG. 1 is a schematic structural diagram of Embodiment 1 of a phase synchronization apparatus for an asynchronous TDD system according to the present invention. As shown in FIG. 1, the apparatus in this embodiment may include: N timing phase adjusters 11, a level calculator 12, and a first selector 13, where each of the N timing phase adjusters 11 is connected to the level calculator 12 and the first selector 13, and the level calculator 12 is connected to the first selector 13, where N is an integer greater than or equal to 2; and each timing phase adjuster 11 is independent. The phase synchronization apparatus for an asynchronous TDD system in this embodiment is disposed in a communications device, and is located in front of a sampling clock recovery apparatus in the communications device. Therefore, the communications device first sends a received signal to the phase synchronization apparatus for an asynchronous TDD system in this embodiment, and then sends the received signal to the sampling clock recovery apparatus, for example, the communications device may directly send the received signal to the sampling clock recovery apparatus or the communications device sends the received signal to the sampling clock recovery apparatus after the signal passes through another apparatus. Moreover, the communications device works in the asynchronous TDD system. In addition, the phase synchronization apparatus for an asynchronous TDD system in this embodiment works in a receive timeslot of the communications device. The phase synchronization apparatus performs phase synchronization processing on an input signal received by the communications device, and sends the input signal on which synchronization processing is performed to the sampling clock recovery apparatus, so that the sampling clock recovery apparatus performs clock recovery on the signal on which synchronization processing is performed. How the phase synchronization apparatus synchronizes an input signal is described in detail below.

The timing phase adjuster 11 in this embodiment is configured to perform phase adjustment on a first signal according to a phase adjustment value corresponding to the timing phase adjuster 11, to obtain an adjusted first signal, and separately send the adjusted first signal to the level calculator 12 and the first selector 13, where the first signal is a baseband signal, and the first signal is a signal that is obtained after the communications device in which the phase synchronization apparatus is located receives a signal, and then the communications device performs filtering processing, radio frequency processing, or the like on the received signal; and the N timing phase adjusters 11 respectively correspond to different phase adjustment values. The first signal is a signal separately sent to the N timing phase adjusters 11. Each timing phase adjuster corresponds to one phase adjustment value, and the phase adjustment value corresponding to each timing phase adjuster is different. Each timing phase adjuster may perform, according to the phase adjustment value corresponding to the timing phase adjuster, phase adjustment on the signal input to the timing phase adjuster. When a receive timeslot is reached, the communications device first sends the received first signal to the phase synchronization apparatus; therefore, each of the N timing phase adjusters in the phase synchronization apparatus receives the first signal, that is, signals received by the N timing phase adjusters are a same signal. Then each timing phase adjuster performs phase adjustment on the received first signal, and outputs an adjusted first signal to the level calculator 12 and the first selector 13. For example, if a phase adjustment value corresponding to a timing phase adjuster is $\pi/2$, and a phase of the first signal phase sent to the timing phase adjuster is $\pi/2$, the timing phase adjuster performs phase adjustment on the first signal according to $\pi/2$, where a phase of an adjusted first signal is $\pi$, and then the timing phase adjuster phase separately sends the adjusted first signal with the phase of $\pi$ to the level calculator 12 and the first selector 13.

The timing phase adjuster 11 in this embodiment may be an adjustable phase shifter in an analog circuit, and performs phase adjustment on the first signal by using a set phase adjustment value; or the timing phase adjuster 11 in this embodiment may be an adjustable delay circuit, and configures a delay length by using a set phase adjustment value, so as to implement phase adjustment on the first signal; or the timing phase adjuster 11 in this embodiment may be a finite impulse response filter with an adjustable parameter in a digital circuit, and calculates a tap coefficient of the filter by using a set phase adjuster, so as to implement phase adjustment on the first signal. However, the timing phase adjuster in this embodiment of the present invention is not limited thereto.

The level calculator 12 in this embodiment is configured to acquire level fluctuation values, within a preset time, of the N adjusted first signals that are obtained by the N timing phase adjusters 11, determine an identifier of an adjusted first signal corresponding to a minimum level fluctuation value, and send the identifier to the first selector 13. The level calculator 12 may receive the adjusted first signal separately sent by the N timing phase adjusters 11, that is, the N adjusted first signals, and then calculate the level fluctuation value, within the preset time, of each of the N adjusted first signals, so that N level fluctuation values may be obtained. It should be noted that a smaller level fluctuation value of the adjusted first signal indicates the phase of the adjusted first signal being closer to a phase of a signal sent by a transmitter to which the first signal belongs, and indicates a better phase synchronization effect. Therefore, the level calculator 12 determines the minimum level fluctuation value from the N level fluctuation values, so that the identifier of the adjusted first signal with the minimum level fluctuation value can be determined, where the identifier may be a sequence number, for example, 2, which represents that the adjusted first signal with the minimum level fluctuation value is output by the second timing phase adjuster. Then, the level calculator 12 outputs the determined identifier to the first selector 13.

The first selector 13 in this embodiment is configured to determine a second signal from the N adjusted first signals according to the identifier sent by the level calculator 12, and output the second signal, where the second signal is the adjusted first signal corresponding to the identifier. The first selector 13 in this embodiment may receive the adjusted first signal separately sent by the N timing phase adjusters 11, that is, the N adjusted first signals. The first selector 13 may also receive the identifier sent by the level calculator 12, then select, from the N adjusted first signals, the adjusted first signal corresponding to the identifier, and output the selected adjusted first signal as the second signal, for example, output the selected adjusted first signal to the sampling clock recovery apparatus. For example, the first selector 13 directly outputs the second signal to the sampling clock recovery apparatus; or the first selector 13 directly outputs the second signal to a pulse-shaping circuit, and then the pulse-shaping circuit outputs the second signal to the sampling clock recovery apparatus; or the first selector 13 directly outputs the second signal to another impairment correction circuit, and then the another impairment correction circuit outputs the second signal to the sampling clock recovery apparatus. For example, if the identifier sent by the level calculator 12 is 2, the first selector 13 uses the adjusted first signal sent by the second timing phase adjuster as the second signal, and sends the second signal to the sampling clock recovery apparatus; and an adjusted first signal sent by another timing phase adjuster ends herein. A phase of the adjusted first signal with the minimum level fluctuation value is the closest to the phase of the signal sent by the transmitter to which the first signal belongs. In this embodiment, a signal obtained after phase synchronization can be determined by using a minimum level fluctuation value, so that fast phase synchronization is implemented, and compared with the prior art, a large quantity of random signals do not need to be inserted during transmission; therefore, overheads can be reduced, transmission efficiency can be improved, and an access time can be reduced.

A relationship between a level fluctuation value and a phase is described in detail below in this embodiment.

Figure 2:
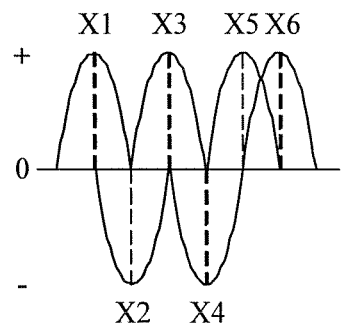
FIG. 2 is a schematic diagram of a pulse waveform of a transmitted signal of a transmitter according to the present invention.

In the asynchronous TDD system, an example in which a communications device A sends information to a communications device B is used. A transmitter in the communications device A inserts a random symbol sequence including no information into the front of each transmit timeslot, and a receiver in the communications device B completes clock signal synchronization according to the random symbol sequence. The random symbol sequence is generally modulated in an easiest modulation mode with a constant amplitude, for example, quadrature phase shift keying (QPSK). In the transmitter, sent information is modulated to quadrature pulse waveforms symbol by symbol according to a clock signal of the transmitter. Herein, the quadrature pulse waveform means that a peak point of a waveform in which a current symbol is located is exactly a null point of a waveform in which an adjacent symbol is located. As shown in FIG. 2, FIG. 2 shows only signal waveforms to which symbols X1, X2, X3, and X4, X5 and X6 belong.

Figure 3:
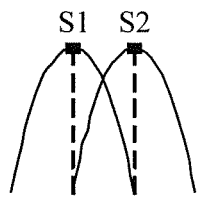
FIG. 3 is a schematic diagram of sampling positions when a phase of a clock signal of a receiver is synchronized with a phase of a clock signal of a transmitter according to the present invention.

When a phase of a clock of the receiver in the communications device B is completely synchronized with a phase of a clock of the transmitter in the communications device A, a sampling point of the receiver is exactly located at a peak position of a signal waveform to which a current symbol belongs, and where the peak position is also a null position of a signal waveform in which an adjacent symbol is located. As shown in FIG. 3, FIG. 3 shows only sampled symbols S1 and S2. As can be known from a feature of a signal with a constant amplitude, an average level value of a segment of sampled signals of the receiver in the communications device B may be expressed as: $E(|S|)=E(|X|)=A$, where A is a level value of a signal with a constant amplitude, $|X|$ represents a level value of a transmitted signal of the transmitter, $E(|X|)$ represents an average level value of transmitted signals of the transmitter, $|S|$ represents a level value of a sampled signal of the receiver, and $E(|S|)$ represents an average level value of sampled signals of the receiver. That is, when the phase of the clock signal of the receiver is completely synchronized with the phase of the clock signal of the transmitter, the average level value of the sampled signals of the receiver is equal to the level value of the transmitted signal of the transmitter. A level variance of a segment of sampled signals of the receiver in the communications device B may be expressed as: $V(|S|)=E[(|S|-A)^2]=\sigma^2$, where $\sigma^2$ is energy of noise.

Figure 4:
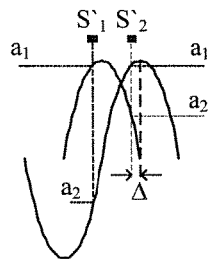
FIG. 4 is a schematic diagram of sampling positions when a phase of a clock signal of a receiver leads according to the present invention.
Figure 5:
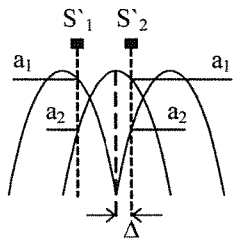
FIG. 5 is a schematic diagram of sampling positions when a phase of a clock signal of a receiver lags according to the present invention.

When there is a deviation between a clock of the receiver in the communications device B and a clock of the transmitter in the communications device A, a sampling point of the receiver deviates from a peak position of a signal waveform to which a current symbol belongs. As a result, a level of a current sampled signal is insufficient, and partial level information of an adjacent signal is mixed into the sampled signal. In this case, as shown in FIG. 4 and FIG. 5, a composition proportion of a level value of a current signal to a level value of the sampled signal is $a_1$, and the level value of the sampled signal includes a level value of an adjacent signal with a proportion of $a_2$, that is, $S'_N=a_1 \times X_N + a_2 \times X_{N\pm1}$, where $S'_N$ the level value of the sampled signal, $X_N$ is the level value of the current signal, $X_{N\pm1}$ is the level value of the adjacent signal, $a_1$ is a level composition proportion of the current signal, $a_2$ is a level composition proportion of the adjacent signal, and $a_1$ and $a_2$ are determined by a phase deviation $\Delta$ between the clock signal of the receiver and the clock signal of the transmitter.

If the phase of the clock signal of the receiver leads the phase of the clock signal of the transmitter, the phase deviation $\Delta$ is a negative value, and when the current signal is sampled, a level of a previous adjacent signal is mixed into the sampled signal. As shown in FIG. 4, level values of two sampled signals are separately $S'_1$ and $S'_2$, $S'_1$ is $a_1 \times X_1 + a_2 \times X_2$, and $S'_2$ is $a_1 \times X_2 + a_2 \times X_3$; a larger absolute value of the phase deviation $\Delta$ indicates smaller $a_1$ and larger $a_2$. If the phase of the clock signal of the receiver lags behind the phase of the clock signal of the transmitter, the phase deviation $\Delta$ is a positive value, and when the current signal is sampled, a level of a next adjacent signal is mixed into the sampled signal. As shown in FIG. 5, level values of two sampled signals are separately $S'_1$ and $S'_2$, $S'_1$ is $a_1 \times X_1 + a_2 \times X_2$, and $S'_2$ is $a_1 \times X_2 + a_2 \times X_3$; a larger absolute value of the phase deviation Δ indicates smaller $a_1$ and larger $a_2$. Because in random signals, there is an equal probability that a level value of each signal is a positive or negative value, an average level value of a segment of sampled signals of the receiver in the communications device B may be expressed as: $E(|S'|)=E(|X|) \times a_1 = A \times a_1$, where A is a level value of a signal with a constant amplitude, |X| represents a level value of a transmitted signal of the transmitter, $E(|X|)$ represents an average level value of transmitted signals of the transmitter, |S'| represents a level value of a sampled signal of the receiver, and $E(|S'|)$ represents an average level value of sampled signals of the receiver. That is, when the phase of the clock signal of the receiver is not synchronized with the phase of the clock signal of the transmitter, the average level value of the sampled signals of the receiver is equal to average level value of the transmitted signals of the transmitter multiplied by a level proportion $a_1$. A level variance of a segment of sampled signals of the receiver in the communications device B may be expressed as: $V(|S'|) = E[(|S'|-A \times a_1)^2] = (|X| \times a_2) + \sigma^2$, where $\sigma^2$ is energy of noise. Because a level proportion $a_2$ is determined by the phase deviation between the clock signal of the receiver and the clock signal of the transmitter, the level variance can reflect a degree of phase synchronization between the clock signal of the receiver and the clock signal of the transmitter, and the level variance of the sampled signal is represented by a level fluctuation of the sampled signal, where a smaller level fluctuation indicates a smaller level variance, a smaller level proportion $a_2$, a smaller phase deviation, and a higher phase synchronization degree. Therefore, in this embodiment of the present invention, a phase synchronization degree is determined according to a level fluctuation value.

In a feasible implementation manner, the level calculator 12 in this embodiment may include: a calculation circuit and a comparison and selection circuit, where the calculation circuit is configured to separately calculate the level fluctuation values, within the preset time, of the N adjusted first signals; and the comparison and selection circuit is configured to determine the minimum level fluctuation value from the N level fluctuation values that are obtained by the calculation circuit through calculation, determine the identifier of the adjusted first signal corresponding to the minimum level fluctuation value, and lock the identifier into an internal register and output the identifier. Optionally, the calculation circuit may include N parallel calculation sub circuits, and each calculation sub circuit includes a signal buffer and a level fluctuation calculation circuit, where the signal buffer is configured to store the adjusted first signals within a preset time, where the preset time may be a time corresponding to a preset symbol quantity, that is, the signal buffer may store an adjusted first signal of a preset quantity of symbol lengths. For example, the signal buffer may store an adjusted first signal with 100 symbol lengths. Then, the level fluctuation calculation circuit calculates a level fluctuation value of the adjusted first signal with a preset quantity of symbol lengths that is stored in the signal buffer, and outputs the level fluctuation value obtained through calculation.

Optionally, in a first feasible implementation manner, the level fluctuation value may be a level variance value, and the foregoing level fluctuation calculation circuit is a variance calculation circuit. The level variance value may be calculated by using the following formula:

$$V = \frac{1}{L}\sum_{i=1}^{L}\left(s_i - \frac{1}{L}\sum_{j=1}^{L}s_j\right)^2,$$

where

V represents the level variance value, L represents a quantity of symbols, within the preset time, of the adjusted first signal, $s_i$ represents the $i^{th}$ symbol, within the preset time, of the adjusted first signal, and $s_j$ represents the $j^{th}$ symbol, within the preset time, of the adjusted first signal.

In a second feasible implementation manner, the level fluctuation value may be a level absolute difference value, and the foregoing level fluctuation calculation circuit is an absolute difference calculation circuit. The level absolute difference value may be calculated by using the following formula:

$$V' = \frac{1}{L}\sum_{i=1}^{L}\left|s_i - \frac{1}{L}\sum_{j=1}^{L}s_j\right|,$$

where

V' represents the level absolute difference value, L represents a quantity of symbols, within the preset time, of the adjusted first signal, $s_i$ represents the $i^{th}$ symbol, within the preset time, of the adjusted first signal, and $s_j$ represents the $j^{th}$ symbol, within the preset time, of the adjusted first signal.

Optionally, the N timing phase adjusters 11, the level calculator 12, and the first selector 13 are connected by using a bus. Therefore, the N adjusted first signals sent by the N timing phase adjusters 11 are transmitted to the bus in parallel; and the level calculator 12 acquires the N parallel adjusted first signals from the bus, where the identifier of the adjusted first signal corresponding to the minimum level fluctuation value determined by the level calculator 12 may be a sequence number of the adjusted first signal in the bus, and outputs the identifier to the first selector 13. The first selector 13 is a multiple-input-single-output selection circuit, and the first selector 13 includes N adjusted first signal input ports, a sequence number input port, and an output port, where the N adjusted first signal input ports are configured to acquire the N parallel adjusted first signals from the bus; the sequence number input port is configured to control an internal transfer switch of the first selector 13 to connect, to the output port, an adjusted first signal corresponding to a sequence number input by the sequence number input port; and the output port is configured to output the connected adjusted first signal.

In this embodiment, the N timing phase adjusters separately perform phase adjustment on a first signal; the level calculator acquires level fluctuation values of N adjusted first signals, and sends, according to that a smaller level fluctuation value indicates a smaller phase deviation, an identifier of an adjusted first signal corresponding to a minimum level fluctuation value to the first selector; and the first selector outputs the adjusted first signal corresponding to the identifier. Therefore, fast phase synchronization is implemented, and compared with the prior art, a large quantity of random signals do not need to be inserted during transmission; therefore, overheads are reduced, transmission efficiency can be improved, and an access time is reduced.

Figure 6:
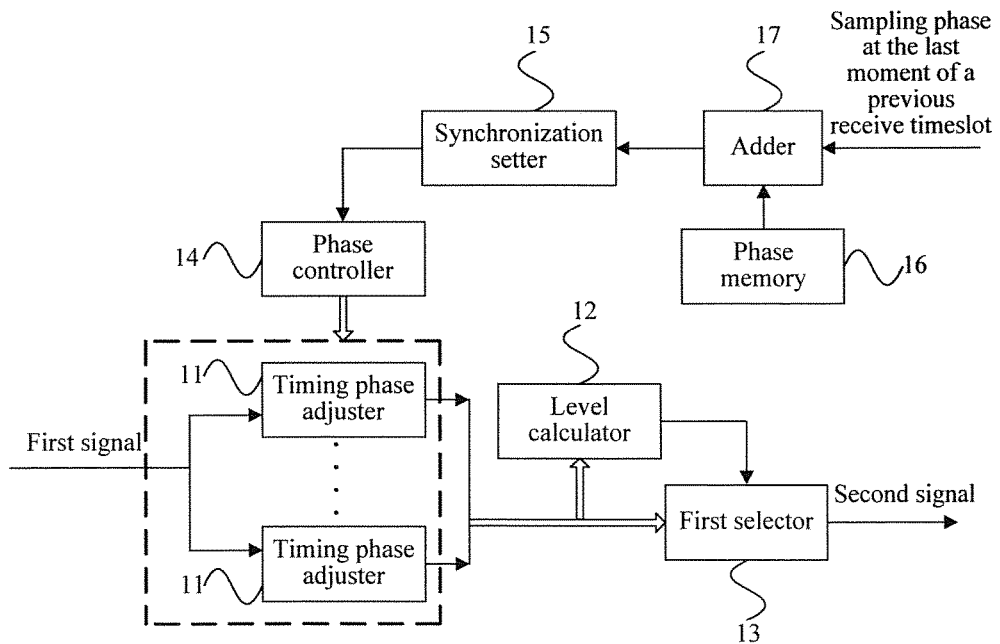
FIG. 6 is a schematic structural diagram of Embodiment 2 of a phase synchronization apparatus for an asynchronous TDD system according to the present invention.

FIG. 6 is a schematic structural diagram of Embodiment 2 of a phase synchronization apparatus for an asynchronous TDD system according to the present invention. As shown in FIG. 6, based on the apparatus embodiment shown in FIG. 1, the apparatus in this embodiment may further include: a phase controller 14. The phase controller 14 is separately connected to the N timing phase adjusters 11, and the phase controller 14 is configured to: divide a phase range whose central value is a first phase into N equal phase subranges, and use central values of the N phase subranges as the N phase adjustment values and send the N phase adjustment values to the N timing phase adjusters 11 respectively, where the phase range whose central value is the first phase is a phase range of [the first phase–a first preset phase, the first phase+the first preset phase]. The phase controller 14 in this embodiment may obtain, according to the first phase, the phase adjustment values that are used when the N timing phase adjusters perform phase adjustment. If the first phase is $\pi$, a phase range whose central value is $\pi$ is $[0, 2\pi]$. If a quantity (that is, N) of timing phase adjusters is 4, the phase controller may divide the phase range of $[0, 2\pi]$ into four equal phase subranges, which are separately $[0, \pi/2]$, $[\pi/2, \pi]$, $[\pi, 3\pi/2]$, and $[3\pi/2, 2\pi]$; determine that a central value of the phase subrange of $[0, \pi/2]$ is $\pi/4$, a central value of the phase subrange of $[\pi/2, \pi]$ is $3\pi/4$, a central value of the phase subrange of $[\pi, 3\pi/2]$ is $5\pi/4$, and a central value of the phase subrange of $[3\pi/2, 2\pi]$ is $7\pi/4$; and then use $\pi/4$ as a phase adjustment value of the first timing phase adjuster, use $3\pi/4$ as a phase adjustment value of the second timing phase adjuster, use $5\pi/4$ as a phase adjustment value of the third timing phase adjuster, and use $7\pi/4$ as a phase adjustment value of the fourth timing phase adjuster.

The phase controller 14 in this embodiment may include multiple output ports, for example, N phase adjustment value output ports, where each output port sends a phase adjustment value to a timing phase adjuster 11 corresponding to the port.

The N timing phase adjusters 11 in this embodiment receive the phase adjustment value separately sent by the phase controller 14. Each timing phase adjuster 11 performs phase adjustment on the first signal according to the phase adjustment value received from the phase controller 14. The timing phase adjuster 11 in this embodiment includes two input ends and one output end, where one input end is configured to receive the first signal, and the other input end is configured to receive the phase adjustment value sent by the phase controller 14; and the output end is configured to send the adjusted first signal.

Optionally, the first phase may be preset, and a value of the first preset phase may be $\pi$, which are not limited herein in this embodiment.

Optionally, the apparatus in this embodiment further includes a synchronization setter 15. The synchronization setter 15 is connected to the phase controller 14, and the synchronization setter 15 is configured to send the phase range whose central value is the first phase to the phase controller 14. Specifically, the phase controller 14 in this embodiment may obtain, according to the first phase sent by the synchronization setter 15, the phase adjustment values that are used when the N timing phase adjusters perform phase adjustment.

Optionally, the apparatus in this embodiment further includes a phase memory 16 and an adder 17. The phase memory 16 is connected to the adder 17, and the adder 17 is further connected to the synchronization setter 15; the phase memory 16 is configured to store a second phase, and send the second phase to the adder 17; the adder 17 is configured to add a sampling phase at the last moment of a previous receive timeslot to the second phase sent by the phase memory 16, and send a phase obtained through addition to the synchronization setter 15; and the synchronization setter 15 is further configured to: before sending the phase range whose central value is the first phase to the phase controller 14, use the phase, obtained by the adder 17 through addition, as the first phase according to a synchronization indication, where the synchronization indication is a first synchronization indication.

In this embodiment, when the communications device is in a current receive timeslot, the adder 17 may acquire a sampling phase at the last moment of a previous receive timeslot. In a receive timeslot, when performing normal receiving communication, a receiver continuously extracts, from a received signal, phase information of a transmit clock of a transmitter sending the signal, and continuously adjusts a sampling phase of the received signal to enable the sampling phase to remain consistent with a phase of the transmit clock. At the last moment of the receive timeslot, the receiver locks a current sampling phase, so that the current sampling phase remains unchanged in a next entire transmit timeslot. The apparatus in the present invention needs to extract, from the receiver, the locked sampling phase at the last moment of the previous receive timeslot. For example, this sampling phase may be obtained from the sampling clock recovery apparatus. In a first feasible implementation manner, the sampling clock recovery apparatus may include a dynamic phase adjuster and a phase-locked loop, and the foregoing sampling phase may be obtained by the dynamic phase adjuster and output to the adder 17. How the dynamic phase adjuster obtains the sampling phase is similar to that in the prior art, and details are not described herein again. In a second feasible implementation manner, the sampling clock recovery apparatus samples a received signal with a high rate, for example, the high rate is 10 times; therefore, each signal corresponds to 10 sampling points with different phases. Sampling points of frame header signals are extracted according to signal frequencies, and 10 groups of frame header sequences with different phases can be obtained. Then correlation calculation is performed on the 10 groups of frame header sequences and a known sequence, and a comparison selector in the sampling clock recovery apparatus selects a phase that corresponds to a frame header sequence with a maximum correlation value as a sampling phase of a current frame. In the method described above, a clock phase is corrected in each frame, a signal and a clock are recovered, one timeslot may include multiple frames, a phase used in the last frame may be used as the sampling phase of the last moment, and then the comparison selector outputs the phase used in the last frame to the adder 17. The adder 17 may also receive the second phase stored in the phase memory 16, where the second phase may be preset and stored in the phase memory 16. Then the adder 17 adds the second phase to the sampling phase at the last moment of the previous receive timeslot, and sends a phase range whose central value is the phase obtained through addition to the synchronization setter 15. When each receive timeslot is just reached, the synchronization setter 15 sets the synchronization indication to the first synchronization indication, where the first synchronization indication is used to instruct the synchronization setter 15 to send, to the phase controller 14, the phase range whose central value is the phase and that is sent by the adder 17.

The synchronization setter 15 in this embodiment includes an input port and an output port, where the input port is configured to receive the phase that is obtained through addition and that is sent by the adder, and the output port sends the phase obtained through addition to the phase controller as the first phase.

In this embodiment, when a current receive timeslot is reached, the adder adds a sampling phase at the last moment of a previous receive timeslot to a phase stored in the phase memory; and the synchronization setter sends a phase range whose central value is a phase and that is obtained after addition to the phase controller, so that the phase controller obtains, according to the phase obtained after addition, phase adjustment values that are used when N timing phase adjusters perform phase adjustment, that is, in a current receive timeslot, the phase adjustment values that are used when the N timing phase adjusters perform phase adjustment are generated according to a phase extracted from the previous receive timeslot; therefore, a phase deviation extracted from a previous receive timeslot can be updated to an initial phase of a clock signal in the current receive timeslot, thereby improving an phase synchronization effect.

Figure 7:
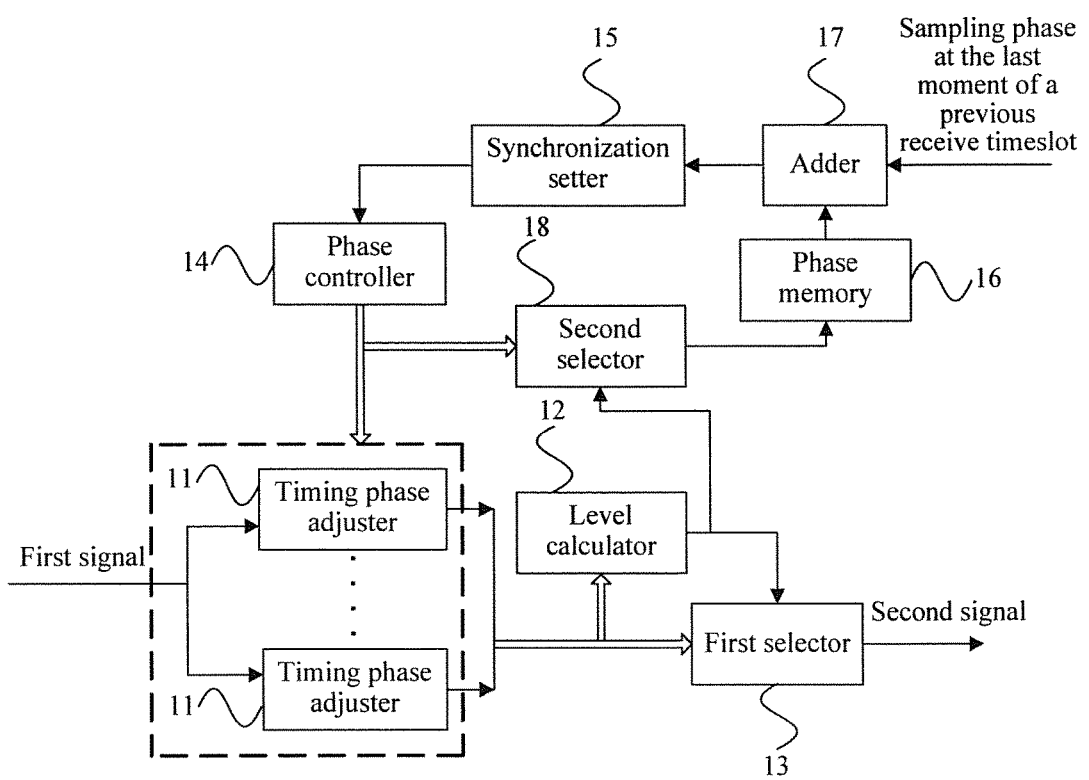
FIG. 7 is a schematic structural diagram of Embodiment 3 of a phase synchronization apparatus for an asynchronous TDD system according to the present invention.

FIG. 7 is a schematic structural diagram of Embodiment 3 of a phase synchronization apparatus for an asynchronous TDD system according to the present invention. As shown in FIG. 7, based on the apparatus embodiment shown in FIG. 6, the apparatus in this embodiment may further include: a second selector 18. The second selector 18 is separately connected to the level calculator 12, the phase controller 14, and the phase memory 16.

The level calculator 12 in this embodiment is further configured to send the identifier to the second selector 18. The phase controller 14 in this embodiment is further configured to send the N phase adjustment values to the second selector. After determining the identifier of the adjusted first signal corresponding to the minimum level fluctuation value, the level calculator 12 in this embodiment not only sends the identifier to the first selector 13, but also sends the identifier to the second selector 18, for example, an output port of the level calculator 12 separately sends the identifier to the first selector 13 and the second selector 18. After separately obtaining the N different phase adjustment values according to the first phase, the phase controller 14 in this embodiment not only separately sends the N phase adjustment values to the N timing phase adjusters 11, but also sends the N phase adjustment values to the second selector 18, for example, the N phase adjustment value output ports of the phase controller 14 separately send the N phase adjustment values to the N timing phase adjusters 11 and the second selector 18.

The second selector 18 is configured to determine, according to the identifier sent by the level calculator 12, a first phase adjustment value from the N phase adjustment values sent by the phase controller 14, and send the first phase adjustment value to the phase memory 16, where the first phase adjustment value is a phase adjustment value in the N phase adjustment values that is used to obtain the second signal corresponding to the identifier. In this embodiment, after receiving the identifier sent by the level calculator 12 and the N phase adjustment values sent by the phase controller 14, the second selector 18 determines the phase adjustment value that is used to obtain the second signal corresponding to the identifier, and uses the phase adjustment value as the first phase adjustment value. For example, if the identifier is 2, the second selector 18 sends, to the phase memory 16, the second phase adjustment value in the N phase adjustment values received from the phase controller 14. The phase memory 16 receives the first phase adjustment value sent by the second selector 18, and stores the first phase adjustment value as a new second phase, where the previously stored second phase is replaced with the first phase adjustment value. In this case, the second phase stored in the phase memory 16 is the first phase adjustment value, and the first phase adjustment value is used to be added to a sampling phase at the last moment of a current receive timeslot when a next receive timeslot starts, to modify an initial phase of a clock signal when the next receive timeslot starts.

The second selector 18 is a multiple-input-single-output selection circuit, and the second selector 18 includes N phase adjustment value input ports, a sequence number input port, and an output port, where the second selector 18 may be connected to the phase controller 14 by using a bus; the N phase adjustment value input ports may be configured to acquire N parallel phase adjustment values from the bus; the sequence number input port is configured to control an internal transfer switch of the second selector 18 to connect, to the output port, a phase adjustment value corresponding to a sequence number input by the sequence number input port; and the output port is configured to output the connected phase adjustment value. If the identifier input by the sequence number input port is 2, the second phase adjustment value is output.

A feasible implementation manner in this embodiment of the present invention is described in detail below. In a receive timeslot, the phase synchronization apparatus for an asynchronous TDD system in this embodiment performs phase synchronization processing once.

During initialization, a phase stored in the phase memory is 0. When the first receive timeslot is reached, there is no sampling phase at the last moment of a previous receive timeslot; therefore, the synchronization setter 15 receives no input of the adder 17, and the synchronization setter 15 may send the phase range of $[0, 2\pi]$ whose central value is $\pi$ to the phase controller 14. The phase controller 14 divides $[0, 2\pi]$ into N equal phase subranges, uses central values of the N phase subranges as N phase adjustment values, then separately sends the N phase adjustment values to the N timing phase adjusters 11, and also sends the N phase adjustment values to the second selector 18. After the N timing phase adjusters 11 separately receive the phase adjustment value sent by the phase controller 14, each timing phase adjuster performs phase adjustment on a received first signal according to the phase adjustment value of the timing phase adjuster, and then each of the N timing phase adjusters 11 sends an adjusted first signal obtained by the timing phase adjuster to the level calculator 12 and the first selector 13. After receiving the N adjusted first signals, the level calculator 12 calculates level fluctuation values, within a preset time, of the N adjusted first signals, determines an identifier of an adjusted first signal corresponding to a minimum level fluctuation value, and separately sends the identifier to the first selector 13 and the second selector 18. The first selector 13 selects, from the N adjusted first signals according to the identifier sent by the level calculator 12, the adjusted first signal corresponding to the identifier and outputs the adjusted first signal corresponding to the identifier (for example, outputs the adjusted first signal corresponding to the identifier to the sampling clock recovery apparatus). The second selector 18 selects, according to the identifier sent by the level calculator 12, a phase adjustment value that is used to obtain the adjusted first signal corresponding to the identifier, and sends the phase adjustment value to the phase memory 16. The phase memory 16 replaces previously stored 0 with the phase adjustment value.

When the second receive timeslot is reached, the adder 17 receives a sampling phase (for example, a sampling phase that is extracted by the sampling clock recovery apparatus at the last moment of the first receive timeslot) at the last moment of the previous receive timeslot. Then, the adder 17 adds the sampling phase to the phase stored in the phase memory 16, and uses a phase, obtained through addition, as a first phase, and sends a phase range whose central value is the first phase to the phase controller 14, where a length of the phase range whose central value is the first phase is $2\pi$. The phase controller 14 divides the phase range whose central value is the first phase into N equal phase subranges, uses central values of the N phase subranges as N phase adjustment values, then separately sends the N phase adjustment values to the N timing phase adjusters 11, and also sends the N phase adjustment values to the second selector 18. After the N timing phase adjusters 11 separately receive the phase adjustment value sent by the phase controller 14, each timing phase adjuster performs phase adjustment on a received first signal according to the phase adjustment value of the timing phase adjuster, and then each of the N timing phase adjusters 11 sends an adjusted first signal obtained by the timing phase adjuster to the level calculator 12 and the first selector 13. After receiving N adjusted first signals, the level calculator 12 calculates level fluctuation values, within a preset time, of the N adjusted first signals, determines an identifier of an adjusted first signal corresponding to a minimum level fluctuation value, and separately sends the identifier to the first selector 13 and the second selector 18. The first selector 13 selects, from the N adjusted first signals according to the identifier sent by the level calculator 12, the adjusted first signal corresponding to the identifier and outputs the adjusted first signal corresponding to the identifier (for example, outputs the adjusted first signal corresponding to the identifier to the sampling clock recovery apparatus). The second selector 18 selects, according to the identifier sent by the level calculator 12, a phase adjustment value that is used to obtain the adjusted first signal corresponding to the identifier, and sends the phase adjustment value to the phase memory 16. The phase memory 16 replaces the phase stored in the previous receive timeslot with the phase adjustment value.

When the third, fourth, fifth, . . . receive timeslots are reached, for a processing process of the phase synchronization apparatus, reference may be made to a processing process of the phase synchronization apparatus when the second receive timeslot is reached, and details are not described herein again.

FIG. 8 is a schematic structural diagram of Embodiment 4 of a phase synchronization apparatus for an asynchronous TDD system according to the present invention. As shown in FIG. 7, the apparatus in this embodiment is based on the apparatus embodiment shown in FIG. 7. Optionally, the second selector 18 in this embodiment is further connected to the synchronization setter 15, and the second selector 18 is further configured to send the first phase adjustment value to the synchronization setter 15. The second selector in this embodiment sends the first phase adjustment value not only to the phase memory 16 but also to the synchronization setter 15, for example, the output port of the second selector sends the first phase adjustment value to the phase memory 16 and the synchronization setter 15.

The synchronization setter 15 in this embodiment is further configured to: after receiving the first phase adjustment value sent by the second selector 18, change the synchronization indication to a second synchronization indication, and update the first phase to the first phase adjustment value. After receiving the first phase adjustment value sent by the second selector 18, the synchronization setter 15 in this embodiment changes the synchronization indication to the second synchronization indication, where the second synchronization indication is used to instruct the synchronization setter 15 to send, to the phase controller 14, the phase range whose central value is the first phase adjustment value sent by the second selector 18. Then the synchronization setter 15 updates the first phase to the first phase adjustment value. Specifically, the synchronization setter 15 uses the first phase adjustment value as the first phase, and sends the phase range (for example, [the first phase adjustment value−the first preset phase, the first phase adjustment value+the first preset phase]) whose central value is the first phase adjustment value to the phase controller 14. After receiving the phase range whose central value is the first phase adjustment value and that is sent by the synchronization setter 15, the phase controller 14 divides the phase range whose central value is the first phase adjustment value into N equal phase subranges, uses central values of the N phase subranges as N phase adjustment values, and separately sends the N phase adjustment values to the N timing phase adjusters 11 and the second selector 18. Then, the synchronization setter 15 may stop updating, and waits until a next receive timeslot is reached and starts. After the N timing phase adjusters 11 separately receive the phase adjustment value sent by the phase controller 14, each timing phase adjuster performs phase adjustment on a received first signal according to the phase adjustment value of the timing phase adjuster, and then each of the N timing phase adjusters 11 sends an adjusted first signal that is obtained by the timing phase adjuster to the level calculator 12 and the first selector 13. After receiving N adjusted first signals, the level calculator 12 calculates level fluctuation values, within a preset time, of the N adjusted first signals, determines an identifier of an adjusted first signal corresponding to a minimum level fluctuation value, and separately sends the identifier to the first selector 13 and the second selector 18. Then the level calculator 12 stops calculation, and waits until a next receive timeslot is reached and starts. The first selector 13 selects, from the N adjusted first signals according to the identifier sent by the level calculator 12, the adjusted first signal corresponding to the identifier and outputs the adjusted first signal corresponding to the identifier (for example, outputs the adjusted first signal corresponding to the identifier to the sampling clock recovery apparatus). The second selector 18 selects, according to the identifier sent by the level calculator 12, a phase adjustment value that is used to obtain the adjusted first signal corresponding to the identifier, and sends the phase adjustment value to the phase memory 16 and the synchronization setter 15. The phase memory 16 replaces the phase stored in the previous receive timeslot with the phase adjustment value. In this case, the synchronization setter 15 already stops updating; therefore, the synchronization setter 15 performs no processing within a current receive timeslot.

Optionally, the synchronization setter 15 sends the phase range whose central value is the first phase adjustment value to the phase controller 14, which may be specifically: sending, by the synchronization setter 15, a phase range of [the first phase adjustment value−a second preset phase, the first phase adjustment value+the second preset phase] to the phase controller 14, where the second preset phase is the first preset phase/N. The phase range that is sent by the synchronization setter 15 to the phase controller 14 after the synchronization setter 15 receives the first phase adjustment value sent by the second selector 18 is 1/N of the phase range that is sent by the synchronization setter 15 the first time to the phase controller 14 within the current receive timeslot.

In this embodiment, after an initial phase of a current receive timeslot is synchronized according to a sampling phase at the last moment of a previous receive timeslot, and after a phase adjustment value for adjusting the initial phase is acquired, phase synchronization is further performed according to the phase adjustment value, which further improves a synchronization effect.

A feasible implementation manner in this embodiment of the present invention is described in detail below. In a receive timeslot, the phase synchronization apparatus for an asynchronous TDD system in this embodiment performs phase synchronization processing twice.

During initialization, a phase stored in the phase memory is 0. When the first receive timeslot is reached, the synchronization setter 15 sets the synchronization indication to the first synchronization indication (for example, coarse synchronization). Because there is no sampling phase at the last moment of a previous receive timeslot, the synchronization setter 15 receives no input of the adder 17, and the synchronization setter 15 may send the phase range of [0, 2π] whose central value is π to the phase controller 14. The phase controller 14 divides [0, 2π] into N equal phase subranges, uses central values of the N phase subranges as N phase adjustment values, then separately sends the N phase adjustment values to the N timing phase adjusters 11, and also sends the N phase adjustment values to the second selector 18. After the N timing phase adjusters 11 separately receive the phase adjustment value sent by the phase controller 14, each timing phase adjuster performs phase adjustment on a received first signal according to the phase adjustment value of the timing phase adjuster, and then each of the N timing phase adjusters 11 sends an adjusted first signal obtained by the timing phase adjuster to the level calculator 12 and the first selector 13. After receiving N adjusted first signals, the level calculator 12 calculates level fluctuation values, within a preset time, of the N adjusted first signals, determines an identifier of an adjusted first signal corresponding to a minimum level fluctuation value, and separately sends the identifier to the first selector 13 and the second selector 18. The first selector 13 selects, from the N adjusted first signals according to the identifier sent by the level calculator 12, the adjusted first signal corresponding to the identifier and outputs the adjusted first signal corresponding to the identifier (for example, outputs the adjusted first signal corresponding to the identifier to the sampling clock recovery apparatus). The second selector 18 selects, according to the identifier sent by the level calculator 12, a phase adjustment value (which is referred to as a first phase adjustment value) that is used to obtain the adjusted first signal corresponding to the identifier, and sends the phase adjustment value to the phase memory 16 and the synchronization setter 15. The phase memory 16 replaces previously stored 0 with the phase adjustment value.

After receiving the first phase adjustment value sent by the second selector 18, the synchronization setter 15 changes the synchronization indication to the second synchronization indication (for example, fine synchronization) from the first synchronization indication, and then sends a phase range (for example, [the first phase adjustment value−π/N/, the first phase adjustment value+π/N]) whose central value is the first phase adjustment value to the phase controller 14. After receiving the phase range whose central value is the first phase adjustment value and that is sent by the synchronization setter 15, the phase controller 14 divides the phase range whose central value is the first phase adjustment value into N equal phase subranges, uses central values of the N phase subranges as N phase adjustment values, and separately sends the N phase adjustment values to the N timing phase adjusters 11 and the second selector 18. Then the synchronization setter 15 may stops the updating, and waits to start when a next receive timeslot reaches. After the N timing phase adjusters 11 separately receive the phase adjustment value sent by the phase controller 14, each timing phase adjuster performs phase adjustment on a received first signal according to the phase adjustment value of the timing phase adjuster, and then each of the N timing phase adjusters 11 sends an adjusted first signal obtained by the timing phase adjuster to the level calculator 12 and the first selector 13. After receiving N adjusted first signals, the level calculator 12 calculates level fluctuation values, within a preset time, of the N adjusted first signals, determines an identifier of an adjusted first signal corresponding to a minimum level fluctuation value, and separately sends the identifier to the first selector 13 and the second selector 18. Then the level calculator 12 stops calculation, and waits until a next receive timeslot is reached and starts. The first selector 13 selects, from the N adjusted first signals according to the identifier sent by the level calculator 12, the adjusted first signal corresponding to the identifier and outputs the adjusted first signal corresponding to the identifier (for example, outputs the adjusted first signal corresponding to the identifier to the sampling clock recovery apparatus). The second selector 18 selects, according to the identifier sent by the level calculator 12, a phase adjustment value that is used to obtain the adjusted first signal corresponding to the identifier, and sends the phase adjustment value to the phase memory 16 and the synchronization setter 15. The phase memory 16 replaces the previously stored phase with the just received phase adjustment value. In this case, the synchronization setter 15 already stops updating; therefore, the synchronization setter 15 performs no processing within a current receive timeslot.

When the second receive timeslot is reached, the synchronization setter 15 sets the synchronization indication to the first synchronization indication, and the adder 17 receives a sampling phase (for example, a sampling phase that is extracted by the sampling clock recovery apparatus in the first receive timeslot) at the last moment of the previous receive timeslot. Then, the adder 17 adds the sampling phase to the phase stored in the phase memory 16, and uses a phase, obtained through addition, as a first phase, and sends a phase range (for example, [the first phase−π/, the first phase+π]) whose central value is the first phase to the phase controller 14. The phase controller 14 divides the phase range whose central value is the first phase into N equal phase subranges, uses central values of the N phase subranges as N phase adjustment values, then separately sends the N phase adjustment values to the N timing phase adjusters 11, and also sends the N phase adjustment values to the second selector 18. After the N timing phase adjusters 11 separately receive the phase adjustment value sent by the phase controller 14, each timing phase adjuster performs phase adjustment on a received first signal according to the phase adjustment value of the timing phase adjuster, and then each of the N timing phase adjusters 11 sends an adjusted first signal obtained by the timing phase adjuster to the level calculator 12 and the first selector 13. After receiving the N adjusted first signals, the level calculator 12 calculates level fluctuation values, within a preset time, of the N adjusted first signals, determines an identifier of an adjusted first signal corresponding to a minimum level fluctuation value, and separately sends the identifier to the first selector 13 and the second selector 18. The first selector 13 selects, from the N adjusted first signals according to the identifier sent by the level calculator 12, the adjusted first signal corresponding to the identifier and outputs the adjusted first signal corresponding to the identifier (for example, outputs the adjusted first signal corresponding to the identifier to the sampling clock recovery apparatus). The second selector 18 selects, according to the identifier sent by the level calculator 12, a phase adjustment value (which is referred to as a first phase adjustment value) that is used to obtain the adjusted first signal corresponding to the identifier, and sends the phase adjustment value to the phase memory 16 and the synchronization setter 15. The phase memory 16 replaces the phase stored in the previous receive timeslot with the phase adjustment value.

After receiving the first phase adjustment value sent by the second selector 18, the synchronization setter 15 changes the synchronization indication to the second synchronization indication (for example, fine synchronization) from the first synchronization indication, and then sends a phase range (for example, [the first phase adjustment value$-\pi/N/$, the first phase adjustment value$+\pi/N$]) whose central value is the first phase adjustment value to the phase controller 14. After receiving the phase range whose central value is the first phase adjustment value and that is sent by the synchronization setter 15, the phase controller 14 divides the phase range whose central value is the first phase adjustment value into N equal phase subranges, uses central values of the N phase subranges as N phase adjustment values, and separately sends the N phase adjustment values to the N timing phase adjusters 11 and the second selector 18. Then the synchronization setter 15 may stops the updating, and waits to start when a next receive timeslot reaches. After the N timing phase adjusters 11 separately receive the phase adjustment value sent by the phase controller 14, each timing phase adjuster performs phase adjustment on a received first signal according to the phase adjustment value of the timing phase adjuster, and then each of the N timing phase adjusters 11 sends an adjusted first signal obtained by the timing phase adjuster to the level calculator 12 and the first selector 13. After receiving N adjusted first signals, the level calculator 12 calculates level fluctuation values, within a preset time, of the N adjusted first signals, determines an identifier of an adjusted first signal corresponding to a minimum level fluctuation value, and separately sends the identifier to the first selector 13 and the second selector 18. Then the level calculator 12 stops calculation, and waits until a next receive timeslot is reached and starts. The first selector 13 selects, from the N adjusted first signals according to the identifier sent by the level calculator 12, the adjusted first signal corresponding to the identifier and outputs the adjusted first signal corresponding to the identifier (for example, outputs the adjusted first signal corresponding to the identifier to the sampling clock recovery apparatus). The second selector 18 selects, according to the identifier sent by the level calculator 12, a phase adjustment value that is used to obtain the adjusted first signal corresponding to the identifier, and sends the phase adjustment value to the phase memory 16 and the synchronization setter 15. The phase memory 16 replaces the previously stored phase with the just received phase adjustment value. In this case, the synchronization setter 15 already stops updating; therefore, the synchronization setter 15 performs no processing within a current receive timeslot.

When the third, fourth, fifth, . . . receive timeslots are reached, for a processing process of the phase synchronization apparatus, reference may be made to a processing process of the phase synchronization apparatus when the second receive timeslot is reached, and details are not described herein again The phase synchronization apparatus for an asynchronous TDD system performs phase synchronization processing twice on a received signal in a receive timeslot, which improves a phase synchronization effect, and further reduces a phase deviation.

FIG. 9 is a flowchart of Embodiment 1 of a phase synchronization method for an asynchronous TDD system according to the present invention. As shown in FIG. 9, the method in this embodiment may include:

S101: Separately perform phase adjustment on a first signal according to N different phase adjustment values, to obtain N adjusted first signals, where the first signal is a baseband signal, and N is an integer greater than or equal to 2.

S102: Acquire level fluctuation values, within a preset time, of the N adjusted first signals.

S103: Determine an identifier of an adjusted first signal corresponding to a minimum level fluctuation value.

S104: Determine a second signal from the N adjusted first signals according to the identifier, and output the second signal, where the second signal is the adjusted first signal corresponding to the identifier.

Optionally, the level fluctuation value is a level absolute difference value or a level variance value.

The technical solution shown in this embodiment may be performed by the phase synchronization apparatus for an asynchronous TDD system shown in FIG. 1, and their implementation principles and technical effects are similar. For details, reference may be made to records in the foregoing embodiment, and details are not described herein again.

Figure 10:
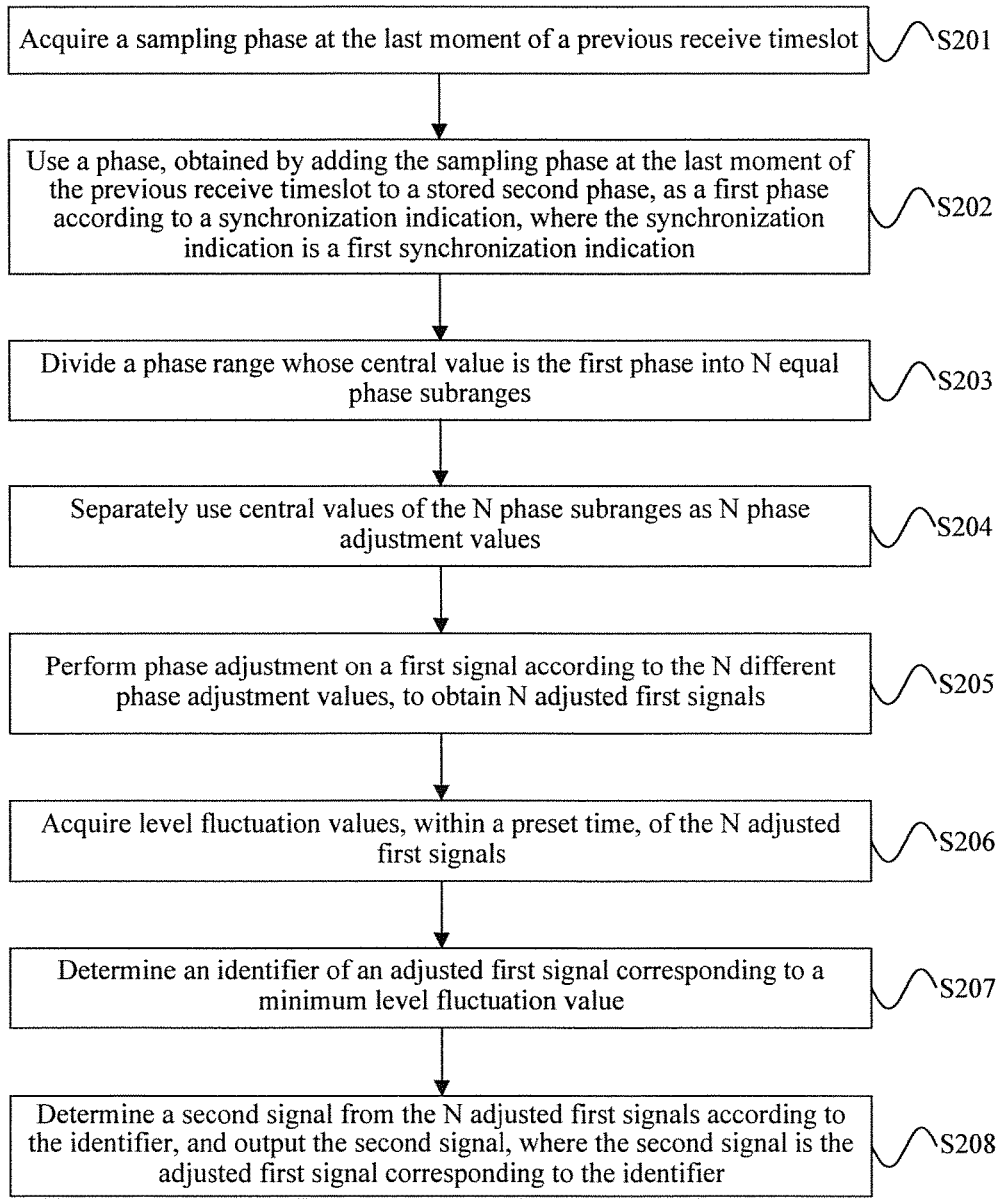
FIG. 10 is a flowchart of Embodiment 2 of a phase synchronization method for an asynchronous TDD system according to the present invention.

FIG. 10 is a flowchart of Embodiment 2 of a phase synchronization method for an asynchronous TDD system according to the present invention. As shown in FIG. 10, the method in this embodiment may include:

S201: Acquire a sampling phase at the last moment of a previous receive timeslot.

S202: Use a phase, obtained by adding the sampling phase at the last moment of the previous receive timeslot to a stored second phase, as a first phase according to a synchronization indication, where the synchronization indication is a first synchronization indication.

S203: Divide a phase range whose central value is the first phase into N equal phase subranges.

S204: Separately use central values of the N phase subranges as N phase adjustment values.

S205: Perform phase adjustment on a first signal according to the N different phase adjustment values, to obtain N adjusted first signals.

S206: Acquire level fluctuation values, within a preset time, of the N adjusted first signals.

S207: Determine an identifier of an adjusted first signal corresponding to a minimum level fluctuation value.

S208: Determine a second signal from the N adjusted first signals according to the identifier, and output the second signal, where the second signal is the adjusted first signal corresponding to the identifier.

The technical solution shown in this embodiment may be performed by the phase synchronization apparatus for an asynchronous TDD system shown in FIG. 6, and their implementation principles and technical effects are similar. For details, reference may be made to records in the foregoing embodiment, and details are not described herein again.

In Embodiment 3 of a phase synchronization method for an asynchronous TDD system of the present invention, the method in this embodiment is based on the method embodiment shown in FIG. 10. Further, the method in this embodiment may further include: storing the first phase adjustment value as the second phase, where the first phase adjustment value is a phase adjustment value in the N phase adjustment values that is used to obtain the second signal.

The technical solution shown in this embodiment may be performed by the phase synchronization apparatus for an asynchronous TDD system shown in FIG. 7, and their implementation principles and technical effects are similar. For details, reference may be made to records in the foregoing embodiment, and details are not described herein again.

Figure 11:
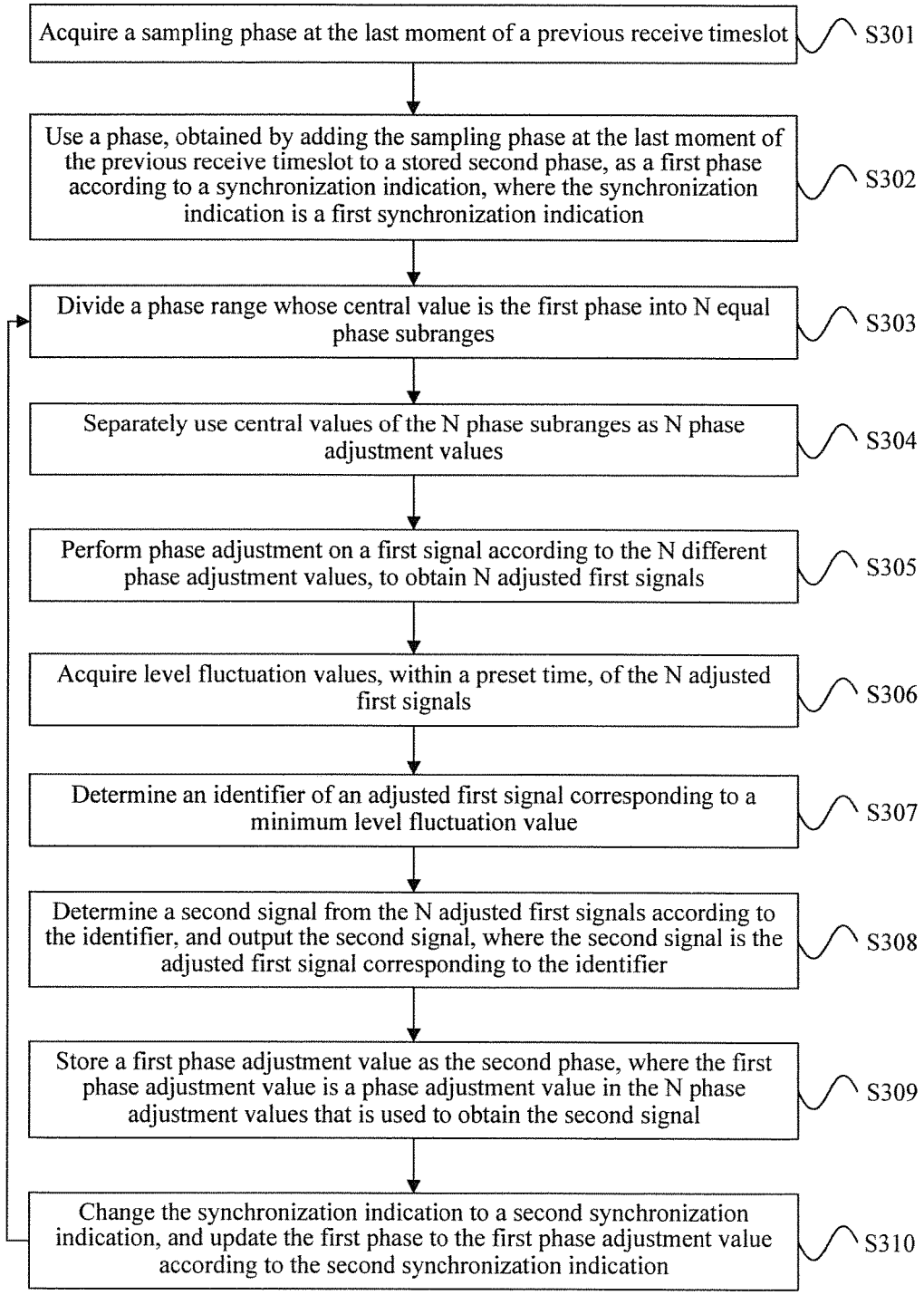
FIG. 11 is a flowchart of Embodiment 4 of a phase synchronization method for an asynchronous TDD system according to the present invention.

FIG. 11 is a flowchart of Embodiment 4 of a phase synchronization method for an asynchronous TDD system according to the present invention. As shown in FIG. 11, the method in this embodiment may include:

S301: Acquire a sampling phase at the last moment of a previous receive timeslot.

S302: Use a phase, obtained by adding the sampling phase at the last moment of the previous receive timeslot to a stored second phase, as a first phase according to a synchronization indication, where the synchronization indication is a first synchronization indication.

S303: Divide a phase range whose central value is the first phase into N equal phase subranges.

S304: Separately use central values of the N phase subranges as N phase adjustment values.

S305: Perform phase adjustment on a first signal according to the N different phase adjustment values, to obtain N adjusted first signals.

S306: Acquire level fluctuation values, within a preset time, of the N adjusted first signals.

S307: Determine an identifier of an adjusted first signal corresponding to a minimum level fluctuation value.

S308: Determine a second signal from the N adjusted first signals according to the identifier, and output the second signal, where the second signal is the adjusted first signal corresponding to the identifier.

S309: Store a first phase adjustment value as the second phase, where the first phase adjustment value is a phase adjustment value in the N phase adjustment values that is used to obtain the second signal.

S310: Change the synchronization indication to a second synchronization indication, and update the first phase to the first phase adjustment value according to the second synchronization indication.

In this embodiment, after the first phase is updated to the first phase adjustment value, the first phase adjustment value is used as the first phase, and step S303 to step S309 are performed again.

The technical solution shown in this embodiment may be performed by the phase synchronization apparatus for an asynchronous TDD system shown in FIG. 8, and their implementation principles and technical effects are similar. For details, reference may be made to records in the foregoing embodiment, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A phase synchronization apparatus for an asynchronous time division duplex (TDD) system, the apparatus comprising:
   N timing phase adjusters, a level calculator, and a first selector, wherein each of the N timing phase adjusters is connected to the level calculator and the first selector, and the level calculator is connected to the first selector, wherein N is an integer greater than or equal to 2;
   wherein each timing phase adjuster is configured to:
      perform phase adjustment on a first signal according to a phase adjustment value corresponding to the timing phase adjuster, to obtain an adjusted first signal, and
      separately send the adjusted first signal to the level calculator and the first selector, wherein the first signal is a baseband signal, and the N timing phase adjusters respectively correspond to different phase adjustment values;
   wherein the level calculator is configured to:
      acquire level fluctuation values, within a preset time, of the N adjusted first signals that are obtained by the N timing phase adjusters,
      determine an identifier of an adjusted first signal corresponding to a minimum level fluctuation value, and
      send the identifier to the first selector; and
   wherein the first selector is configured to:
      determine a second signal from the N adjusted first signals according to the identifier sent by the level calculator, and
      output the second signal, wherein the second signal is the adjusted first signal corresponding to the identifier.

2. The apparatus according to claim 1, wherein the level fluctuation value is a level absolute difference value or a level variance value.

3. The apparatus according to claim 1, further comprising:
   a phase controller, separately connected to the N timing phase adjusters, and configured to:
      divide a phase range whose central value is a first phase into N equal phase subranges, and
      use central values of the N phase subranges as the N phase adjustment values and send the N phase adjustment values to the N timing phase adjusters, respectively, wherein the phase range whose central value is the first phase is a phase range of [the first phase−a first preset phase, the first phase+the first preset phase].

4. The apparatus according to claim 3, further comprising:
   a synchronization setter, connected to the phase controller, and configured to send the phase range whose central value is the first phase to the phase controller.

5. The apparatus according to claim 4, further comprising:
a phase memory configured to store a second phase and output the second phase;
an adder connected to the phase memory and the synchronization setter and configured to:
add a sampling phase at the last moment of a previous receive timeslot to the second phase output by the phase memory, and
send a phase obtained through addition to the synchronization setter; and
wherein the synchronization setter is further configured to: before sending the phase range whose central value is the first phase to the phase controller, use the phase, obtained by the adder through addition, as the first phase according to a synchronization indication, wherein the synchronization indication is a first synchronization indication.

6. The apparatus according to claim 5, further comprising a second selector, separately connected to the level calculator, the phase controller, and the phase memory, wherein:
the level calculator is further configured to send the identifier to the second selector;
the phase controller is further configured to send the N phase adjustment values to the second selector;
the second selector is configured to determine, according to the identifier sent by the level calculator, a first phase adjustment value from the N phase adjustment values sent by the phase controller, and send the first phase adjustment value to the phase memory, wherein the first phase adjustment value is a phase adjustment value in the N phase adjustment values that is used to obtain the second signal corresponding to the identifier; and
the phase memory is further configured to store the first phase adjustment value as the second phase.

7. The apparatus according to claim 6, wherein:
the second selector is further connected to the synchronization setter and further configured to send the first phase adjustment value to the synchronization setter; and
the synchronization setter is further configured to: after receiving the first phase adjustment value sent by the second selector, change the synchronization indication to a second synchronization indication, and update the first phase to the first phase adjustment value.

8. The apparatus according to claim 7, wherein the synchronization setter is configured to send a phase range of [the first phase adjustment value−a second preset phase, the first phase adjustment value+the second preset phase] to the phase controller, wherein the second preset phase is the first preset phase/N.

9. A phase synchronization method for an asynchronous time division duplex (TDD) system, the method comprising:
separately performing phase adjustment on a first signal according to N different phase adjustment values, to obtain N adjusted first signals, wherein the first signal is a baseband signal, and N is an integer greater than or equal to 2;
acquiring level fluctuation values, within a preset time, of the N adjusted first signals;
determining an identifier of an adjusted first signal corresponding to a minimum level fluctuation value; and
determining a second signal from the N adjusted first signals according to the identifier, and outputting the second signal, wherein the second signal is the adjusted first signal corresponding to the identifier.

10. The method according to claim 9, wherein the level fluctuation value is a level absolute difference value or a level variance value.

11. The method according to claim 9, wherein before separately performing phase adjustment on a first signal according to N different phase adjustment values, to obtain N adjusted first signals, the method further comprises:
dividing a phase range whose central value is a first phase into N equal phase subranges; and
separately using central values of the N phase subranges as the N phase adjustment values, wherein the phase range whose central value is the first phase is a phase range of [the first phase−a first preset phase, the first phase+the first preset phase].

12. The method according to claim 11, wherein before dividing a phase range whose central value is a first phase into N equal phase subranges, the method further comprises:
acquiring a sampling phase at the last moment of a previous receive timeslot; and
using a phase, obtained by adding the sampling phase at the last moment of the previous receive timeslot to a stored second phase, as the first phase according to a synchronization indication, wherein the synchronization indication is a first synchronization indication.

13. The method according to claim 12, further comprising:
storing a first phase adjustment value as the second phase, wherein the first phase adjustment value is a phase adjustment value in the N phase adjustment values that is used to obtain the second signal.

14. The method according to claim 13, wherein after determining an identifier of an adjusted first signal corresponding to a minimum level fluctuation value, the method further comprises:
changing the synchronization indication to a second synchronization indication; and
updating the first phase to the first phase adjustment value according to the second synchronization indication.

15. The method according to claim 14, wherein dividing a phase range whose central value is a first phase into N equal phase subranges further comprises:
dividing a phase range of [the first phase adjustment value−a second preset phase, the first phase adjustment value+the second preset phase] into N equal phase subranges according to the second synchronization indication, wherein the second preset phase is the first preset phase/N.

* * * * *